United States Patent
Strong et al.

(10) Patent No.: US 8,452,954 B2
(45) Date of Patent: May 28, 2013

(54) METHODS AND SYSTEMS TO BIND A DEVICE TO A COMPUTER SYSTEM

(75) Inventors: Robert W. Strong, Folsom, CA (US); Steve Grobman, El Dorado Hills, CA (US); Craig Owen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 12/756,782

(22) Filed: Apr. 8, 2010

(65) Prior Publication Data

US 2011/0252227 A1     Oct. 13, 2011

(51) Int. Cl.
   *H04L 29/06*     (2006.01)
(52) U.S. Cl.
   USPC ........... 713/151; 713/155; 713/168; 713/170; 726/2; 726/9; 726/14
(58) Field of Classification Search
   USPC .................. 713/151, 155, 168, 170; 726/2, 9, 726/14
   See application file for complete search history.

(56) References Cited

U.S. PATENT DOCUMENTS

| | | | |
|---|---|---|---|
| 6,249,868 B1 * | 6/2001 | Sherman et al. | 713/168 |
| 2008/0052770 A1 * | 2/2008 | Ali et al. | 726/9 |
| 2009/0070467 A1 * | 3/2009 | Khosravi et al. | 709/225 |

* cited by examiner

*Primary Examiner* — Edward Zee
*Assistant Examiner* — Baotran N To
(74) *Attorney, Agent, or Firm* — Garrett IP, LLC

(57) ABSTRACT

Methods and systems to bind a computer device to one or more computer systems, such that only an authorized computer system may access a protected portion of the device. A processor within the computer system may provide a proxy environment to interface between the device and a trusted environment of the computer system, such as a management environment that is secure from the proxy environment. The device may be configured to authenticate the trusted environment through the proxy environment, and to verify integrity of messages exchanged with the trusted environment through the proxy environment. Authentication may include a SSL and/or TSL handshake protocol. The device may be configured to authenticate a certificate, such as an X.509 certificate, a certificate chain, and/or a hash thereof. The device may include computer memory, a printer, display, circuit board, keyboard, mouse, pointing device, and/or other physical device.

17 Claims, 8 Drawing Sheets

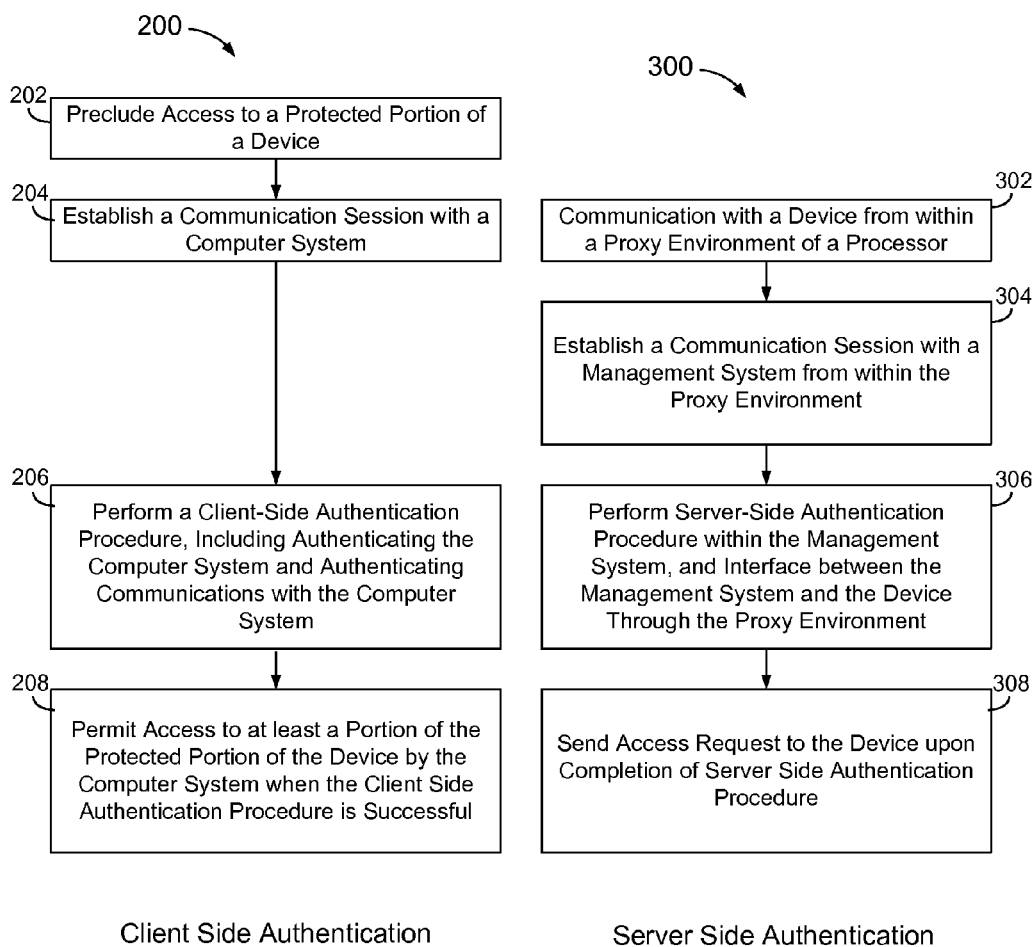

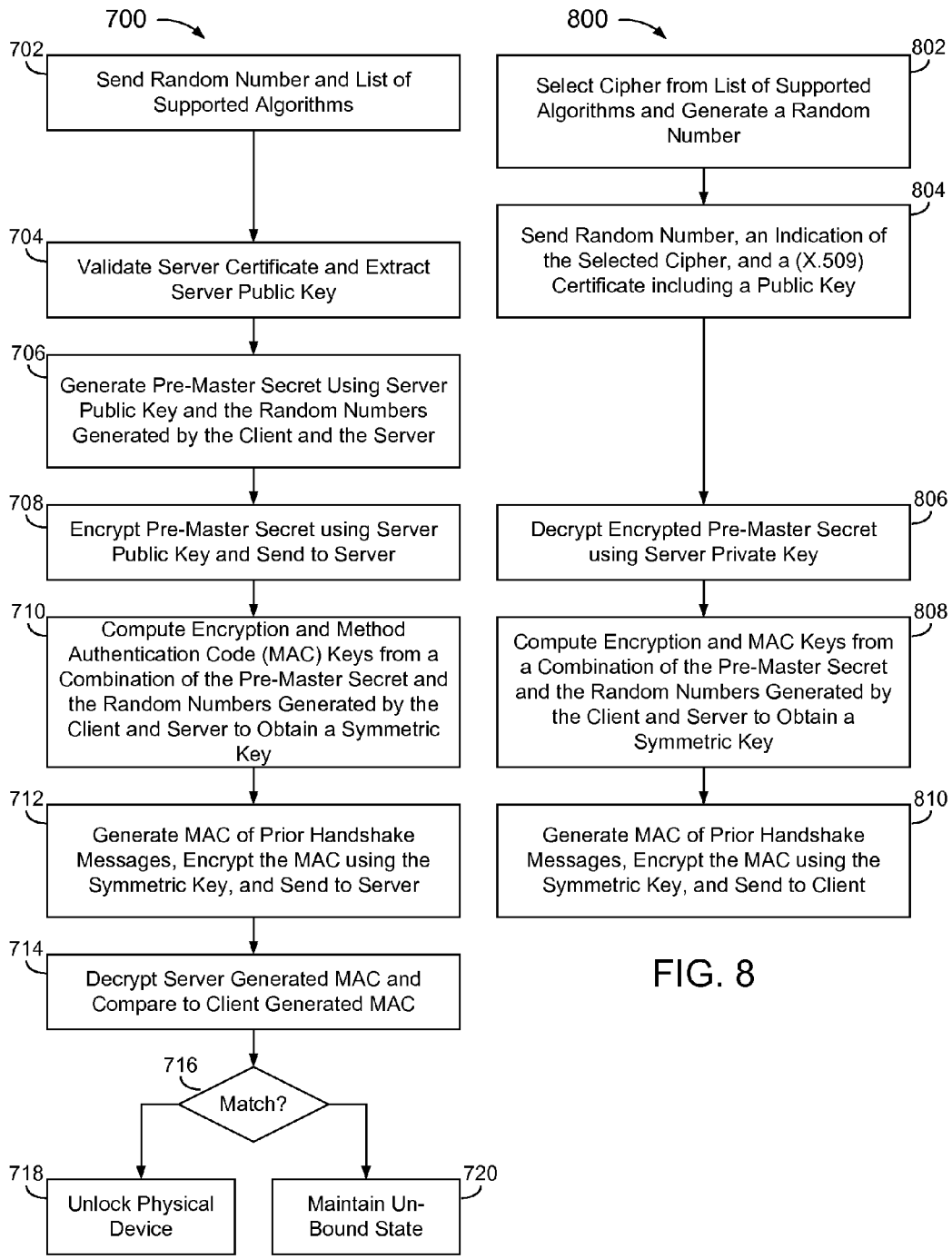

METHODS AND SYSTEMS TO BIND A DEVICE TO A COMPUTER SYSTEM

BACKGROUND

A computer system may be configured to access a physical device, such as a solid state storage device (SSD) or a hard disk drive (HDD), through a device interface, such as a universal serial bus (USB) interface or a serial ATA (SATA) interface.

It may be desirable to limit access to a physical device to selected computer systems.

A host processor environment of a computer system may not be trusted to provide identification information.

The computer system may include a secure management system to perform management operations outside of the host processor environment. The management system may correspond to an Intel® Active Management Technology (AMT) system developed by Intel Corporation, of Santa Clara, Calif. The management system may include a management system interface to communicate with the host processor environment. The management system interface may not be directly accessible to a physical device used by the host processor, and an indirect path between the management system interface and the device may be vulnerable to a man-in-the-middle (MIM) attack.

Network-based authentication protocols have been developed to permit a client computer system to authenticate a server computer system over a network such as the Internet. Network-based authentication protocols include a secure sockets layer (SSL) protocol and a transport layer security (TLS) protocol. A network-based authentication protocol may use a certificate in conformance with an X.509 standard, promulgated under the coordination of the Telecommunication Standardization Sector (ITU-T), based in Geneva, Switzerland, on behalf of the International Telecommunication Union (ITU).

BRIEF DESCRIPTION OF THE DRAWINGS/FIGURES

FIG. 2 is a flowchart of a method of performing a client-side authentication procedure.

FIG. 3 is a flowchart of a method of performing a proxy-based server-side authentication procedure.

FIG. 7 is a flowchart of a method of performing a client-side authentication procedure in accordance with a SSL and/or TSL protocol.

FIG. 8 is a flowchart of a method of performing a server-side authentication procedure in accordance with the SSL and/or TSL protocol.

Figure 1:
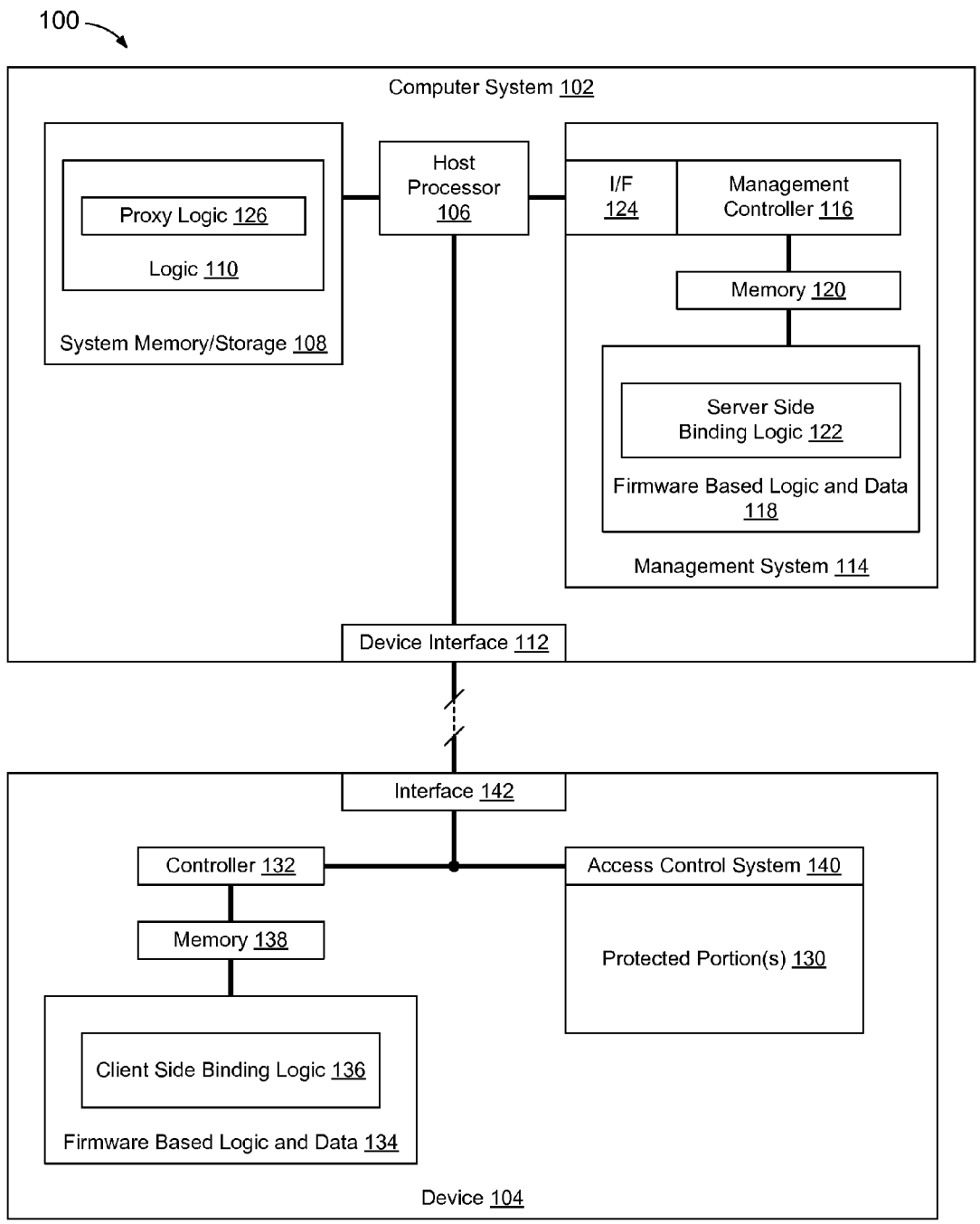
FIG. 1 is a block diagram of an example environment including a computer system and a device.

In the drawings, the leftmost digit(s) of a reference number identifies the drawing in which the reference number first appears.

DETAILED DESCRIPTION

Disclosed herein are methods and systems to bind a computer device to one or more computer systems or platforms, such that an authorized computer system may access a protected portion of the device, while other computer systems may not access the protected portion of the device.

The protected portion of the device may include, for example and without limitation, computer memory or storage, a printer, display, circuit board, keyboard, mouse, pointing device, or other physical device accessible to and/or operable by a computer system. Where the protected portion of the device includes memory, for example, binding may prevent a computer system from accessing data (read and/or write) within a global range and/or a locking range of the memory until the computer system is authenticated.

Authentication may include authentication of the computer system and authentication of a user of the computer system, such with a user name and password, failure of either of which may preclude access to the device from the computer system.

The device may be configured to bind with multiple computer systems, which may be associated with an entity or organization, referred to herein as OrgBinding. OrgBinding may be implemented to restrict access to and/or use of a device to a set of authorized platforms.

Binding authentication may be performed unilaterally, wherein the device authenticates a computer system, or may be performed bilaterally, where the device authenticates the computer system and the computer system authenticates the device.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software, code, and logic, as used herein, refer to a computer program product including a computer readable medium having computer program logic stored thereon to cause an instruction processor to perform one or more functions in response thereto.

FIG. 1 is a block diagram of an example environment 100, including a computer system 102 and a device 104.

Computer system 102 may include one or more host processors, illustrated here as a processor 106.

Computer system 102 may include system memory and/or storage 108 to store logic 110 to cause processor 106 to perform functions in response thereto.

Computer system 102 may include a device interface 112 to communicate between processor 106 and device 104. Device interface 112 may include one or more of a wired interface and a wireless interface, and may include, for example and without limitation, one or more of a SATA interface and a USB interface.

Computer system 102 may include a trusted environment that is secure from processor 106. The trusted environment may include a management system 114 having a management controller 116 to provide remote management and security features with respect to processor 106. Management system 114 and management controller 116 may correspond to an Intel® active management technology (AMT) system and an Intel® manageability engine (ME), respectively. Other trusted environments may be utilized.

The trusted environment may include trusted logic and data that is stored secure from environments of processor 106. For example, management system 114 may include firmware based logic and data 118 to cause management controller 116 to perform functions in response thereto. Management system 114 may be configured to copy logic and data 118 from firmware into memory 120 during a boot phase and/or during run-time, to be used by management controller 116. Memory 120 may include memory dedicated to management system 114, and/or a protected portion of system memory 108.

The trusted environment may be configured to perform server side binding authentication functions with respect to device 104. In the example of FIG. 1, logic 118 includes server side binding logic 122 to cause management controller 116 to perform server side binding authentication functions.

Management system 114 may include a management system interface 124 to communicate between management system 114 and an environment of processor 106. Management system interface 124 may include, for example and without limitation, a host embedded controller interface (HECI), such as an Intel management engine interface (Intel MEI). A HECI or Intel MEI may be implemented as a peripheral component interconnect (PCI) device, and may be accessible to an operating environment and/or a pre-boot authentication environment or state of processor 106.

Processor logic 110 may include proxy logic 126 to cause processor 106 to host a proxy environment for device 104, to permit device 104 to communicate with management system 114 through management interface 124 during the binding authentication procedure.

Proxy logic 126 may include logic to communicate with device 104 through device interface 112, logic to establish a communication session with management system 114 through management interface 124, and logic to interface between management system 114 and device 104 during the binding authentication procedure.

Proxy logic 126 may include local manageability service (LMS) logic developed by Intel Corporation, or a modified version thereof. LMS is a proxy service configured to transfer transmission control protocol (TCP) requests (open connection, close connection & TCP packets), between management applications running on processor 106 and management system 114, through management interface 124. LMS may run in a user space within an operating environment of processor 106. LMS may listen for requests directed to management system 114 and intercept SOAP/HTTP (simple object access protocol/hypertext transfer protocol) messages addressed to processor 106, and may route the requests to management system 114 through management interface 124. LMS may enable management applications with an operating environment of processor 106 to send requests to, and to receive responses from management system 114.

Device 104 includes a protected portion 130, which may include, without limitation, one or more computer memory or storage, a printer, display or monitor, circuit board, and/or other internal or peripheral device.

Device 104 further includes a controller 132 and firmware-based logic and data 134 to cause controller 132 to perform functions in response thereto.

Device 104 may include memory 138, and controller 132 may be configured to copy logic and data 134 to memory 138 during a boot phase and/or during run-time.

Logic 134 may include client side binding logic 136 to cause controller 132 to perform a client-side binding authentication procedure.

Device 104 may include an access control system 140 to control access to protected portion 130 under control of controller 132. Access control system 140 may be configured to preclude access to protected portion 130 by computer system 102 until computer system 102 is authenticated by controller 132.

Device 104 further includes an interface 142 to communicate with computer system 102. Interface 142 may include one or more of a wired interface and a wireless interface. Interface 142 may include, for example and without limitation, one or more of a SATA interface and a USB interface.

FIG. 2 is a flowchart of a method 200 of performing a client-side authentication procedure.

FIG. 3 is a flowchart of a method 300 of performing a proxy-based server-side authentication procedure.

Method 200 is described below as implemented by device 104 in FIG. 1. Method 300 is described below as implemented by computer system 102 in FIG. 1. Methods 200 and 300 are not, however, limited to the example of FIG. 1.

Methods 200 and 300 may be performed during a boot phase or pre-boot phase of computer system 102, and/or upon a subsequent connection of device 104 computer system 102.

Regarding client side authentication, at 202 in FIG. 2, access to protected portion 130 of device 104 is initially precluded.

At 204, a communication session is established with computer system 102.

At 206 a client side authentication procedure is performed to authenticate computer system 102. The client side authentication procedure may include authenticating a certificate or certificate chain received from computer system 102, and verifying message integrity with respect to messages exchanged between device 104 and computer system 102. The certificate may correspond to an X.509 certificate. Message integrity may be verified, such as to avoid man-in-the-middle (MIM) attacks.

At 208, when the client side authentication procedure at 206 is successful, computer system 102 may be permitted to access at least a portion of protected portion 130.

Regarding server-side authentication, at 302 in FIG. 3, a proxy environment of processor 106 communicates with device 104 to initiate an authentication procedure. The proxy environment may be hosted within a pre-boot authentication (PBA) environment or an operating environment of processor 106.

At 304, the proxy environment establishes a communication session with management system 114 through interface 124.

At 306, management system 114 performs server side authentication functions, and the proxy environment interfaces between device 104 and management system 114, effectively acting as a proxy of device 104.

At 308, upon completion of the server side authentication process at 306, computer system 102 sends an access request to device 104 to access protected portion 130 of device 104.

Figure 4:
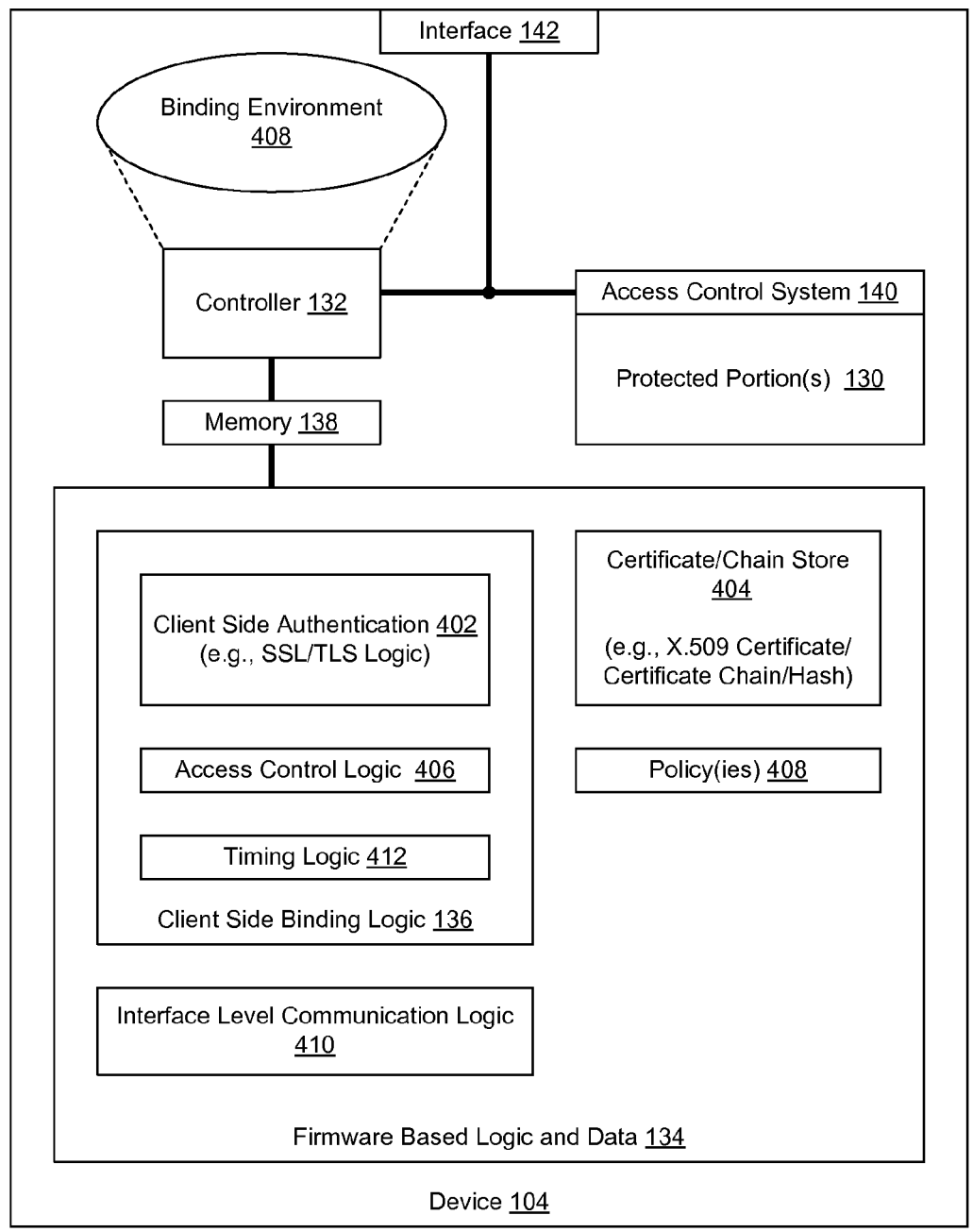
FIG. 4 is a block diagram of the device of FIG. 1.

FIG. 4 is a block diagram of device 104, wherein client side binding logic 136 includes authentication logic 402 to cause controller 132 to authenticate a certificate or certificate chain received from computer system 102, or hash thereof, and to verify message integrity with respect to messages exchanged between device 104 and computer system 102.

Authentication logic 402 may include one or more of SSL and TLS logic to cause controller 132 to perform a client-side authentication handshake protocol and to implement a record layer protocol in accordance with a SSL and/or TLS protocol. A certificate may correspond to an X.509 certificate.

Firmware based data 134 may include a certificate or certificate chain store (certificate store) 404 to store one or more certificates or certificate chains to be compared with a certificate or certificate chain received from computer system 102.

Alternatively, or additionally, certificate store 404 may be provisioned with one or more hash values of one or more corresponding certificates or certificate chains, and controller 132 may be configured to compute a hash value of a certificate or certificate chain received from computer system 102, to compare with hash values in certificate store 404. Storage and comparison of hash values rather than certificates or certificate chains may utilize fewer resources, such as memory and computations.

Certificate store 404 may be provisioned with one or more certificates, certificate chains, and/or hash values in advance, such as disclosed further below.

Access control system 140 may be pre-configured with a default state that precludes access to protected portion 130, and logic 136 may include access control logic 406 to cause controller 132 to permit computer system 102 to access protected portion 130 in accordance with a current binding state and in accordance with one or more policies 408.

Access control logic 406 may include interface level communication logic 410 to cause controller 132 communicate with computer system 102 at an interface level prior to binding authentication and/or subsequent to a failure to authenticate. For example, interface level communication logic 410 may be permit controller 132 to receive ATA commands, such as trusted send, trusted receive, and identify device commands, from computer system 102.

Interface level communication logic 410 may include logic to cause controller 132 to provide binding information in response to a request from computer system 102. Binding information may indicate whether device 104 is configured to bind, and whether device 104 has been provisioned with a certificate, certificate chain, or hash thereof.

Interface level communication logic 410 may include logic to cause controller 132 to request and validate user authentication information from computer system 102, such as a user name and password.

Interface level communication logic 410 may include logic to invoke client side authentication logic 402 in response to a request from computer system 102 and/or upon validation of user authentication information.

Client side binding logic 136 may include timing logic 412 to cause controller to 132 to require a challenge procedure to complete successfully within a pre-determined period of time. This may be useful, for example, to insure that device 104 only permits physically proximate local computer systems to access protected portion 130. For example, a physically remote computer system, relative to device 104, with a valid certificate may be compromised with a rogue protocol pusher. Such an attack may permit an SSL challenge to be re-routed from a local computer system to the compromised computer system. The pre-determined period of time may be selected to make it difficult or impossible for the remote computer system to complete the challenge within the pre-determined period of time. The pre-determined period of time may be set to, for example, approximately 10 milliseconds.

Figure 5:
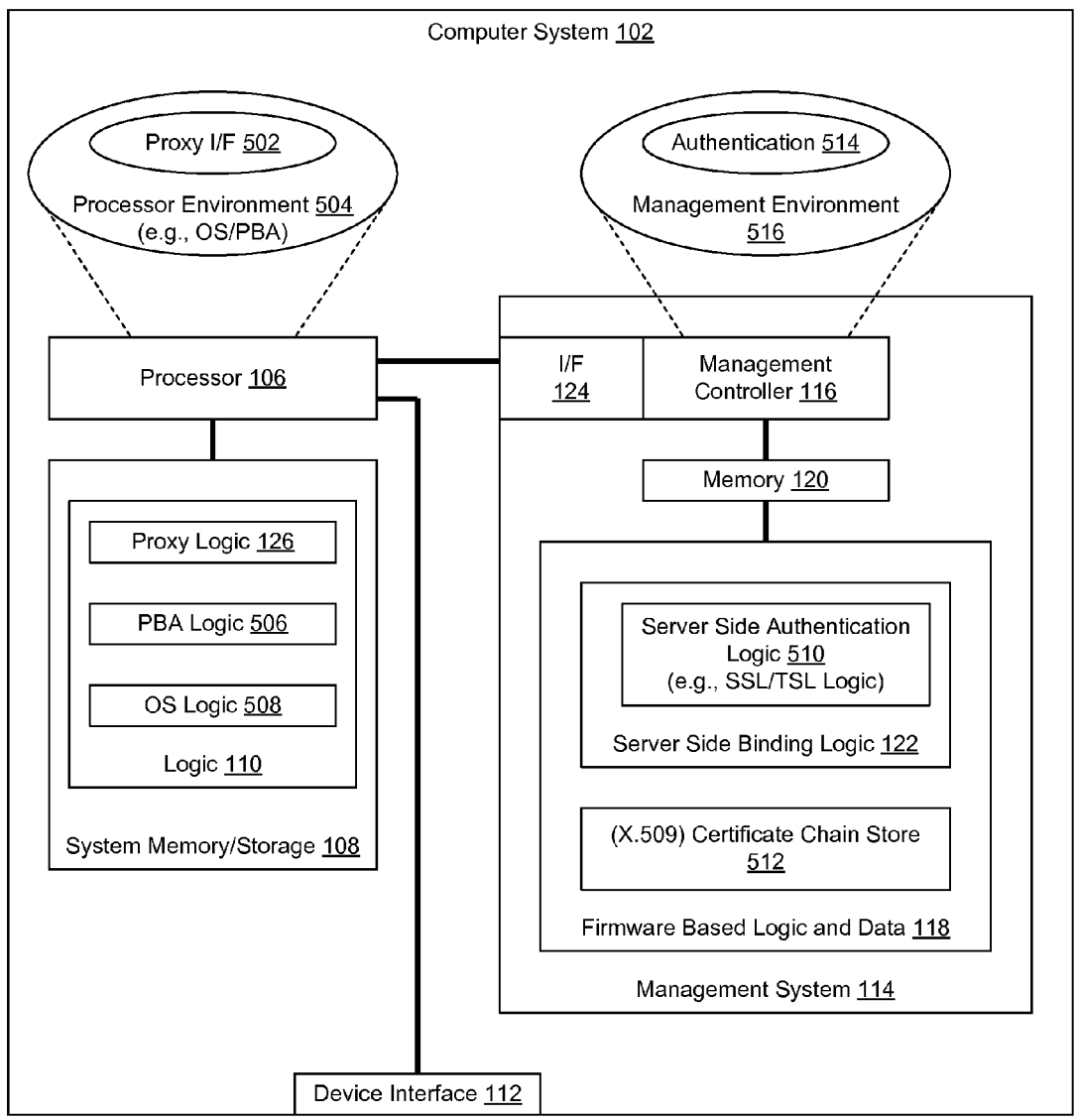
FIG. 5 is a block diagram of the computer system of FIG. 1.

FIG. 5 is a block diagram of computer system 102, wherein processor 106 is configured to host a proxy interface environment 502 within an environment 504, to permit device 104 to communicate with management system 118. Environment 504 may correspond to one or more of a pre-boot authentication (PBA) environment and an operating system (OS) environment. Logic 318 may include corresponding PBA logic 506 and/or OS logic 508.

Server side binding logic 326 may include server side authentication logic, which may include one or more of SSL and TLS server logic 510, to cause management controller 116 to perform corresponding SSL or TLS server side authentication functions within an authentication environment 514 of a management environment 516.

Firmware based data 118 may include a store 512 to store one or more provisioned certificates or certificate chains.

Figure 6:
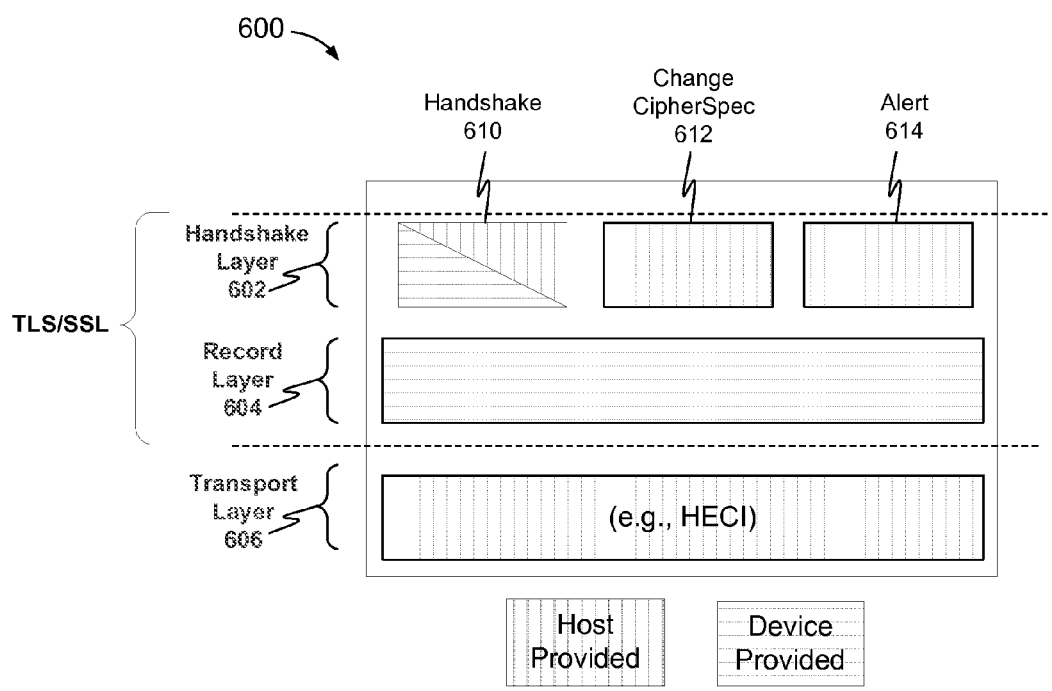
FIG. 6 is a graphic depiction of example protocol layers to authenticate a computer system and to verify integrity of messages exchanged with the computer system during an authentication procedure.

FIG. 6 is a graphic depiction of example protocol layers 600 to authenticate a computer system and to verify integrity of messages exchanged with the computer system during an authentication handshake procedure.

Layers 600 include a handshake layer 602, a record layer 604, and a transport layer 606. In the example of FIG. 6, horizontal shading represents client side processes implemented at device 104. Vertical shading represents server side processes implemented at computer system 102.

Handshake layer 602 and a record layer 604 may be implemented in accordance with one or more of SSL and TLS protocols. Handshake layer 602 permits device 104 to authenticate computer system 102. Record layer 604 provides connection security and reliability.

Symmetric cryptography may be used to encrypt data. Symmetric-key algorithms are a class of algorithms for cryptography that use related, sometimes identical, cryptographic keys for both decryption and encryption. Keys for symmetric encryption may be generated uniquely for each connection, and may be are based on a secret negotiated by handshake layer 602.

An encryption key may be related to a decryption key, in that they may be identical or there may be a relatively simple transformation to obtain one key from the other key. The keys may represent a shared secret between device 104 and computer system 102 that can be used to maintain a private information link.

A message integrity check may be employed using keyed message authentication code (MAC). A MAC is a relatively short piece of information used to authenticate a message. A MAC algorithm, sometimes called a keyed or cryptographic hash function, accepts as input a secret key and an arbitrary-length message to be authenticated, and outputs a MAC, or tag. The MAC value protects both a message's data integrity as well as its authenticity, by allowing verifiers who also possess the secret key to detect any changes to the message content. MAC algorithms are designed to produce matching MACs only if the same message, secret key, and initialization vector are input to the same algorithm.

MAC algorithms may be constructed from other cryptographic primitives, such as cryptographic hash functions, as in the case of a hash-based MAC (HMAC). Secure hash functions may be used for MAC computations.

Handshake layer 602 may include a handshake protocol 610 to negotiate an encryption algorithm and cryptographic keys, a ChangeCipherSpec protocol 612 to indicate a switch to encrypted communication, and an alert protocol 614 to signal an error during handshaking. Handshake portion 610 may be performed between device 104 and proxy interface 502 in FIG. 5. ChangeCipherSpec portion 612 and alert portion 614 may be performed within proxy environment 502 in FIG. 5.

Record layer 604 may provide encapsulation of handshake layer 602, and may be implemented by device 104. Record layer 604 also provides privacy and data integrity between device 104 and management system 114, such as to protect communications against potential man-in-the-middle attacks, including attacks involving host proxy environment 502 and/or processor environment 504 in FIG. 5.

Transport layer 606 provides a mechanism to move data from processor environment 504 to device 104. Transport layer 606 may be implemented by management interface 124, such as a HECI interface.

FIG. 7 is a flowchart of a method 700 of performing a client-side authentication procedure in accordance with a SSL and/or TSL protocol.

FIG. 8 is a flowchart of a method 800 of performing a server-side authentication procedure in accordance with the SSL and/or TSL protocol.

Methods 700 and 800 are described together below to illustrate example interactions between a client and a server. The client may correspond to device 104. The server may correspond to computer system 102.

At 702, a client sends a list of algorithms supported by the client, and a random number to be used during a key generation phase, to a server.

At 802, the server selects a cipher from the list of supported algorithms provided by the client. The server also generates a random number to be used during the key generation phase.

At 804, the server sends the client an indication of the server-selected cipher, the server-generated random number, and a certificate containing a pubic key of the server.

The certificate may include an X.509 certificate, and may serve as a container for the public key. The certificate may be digitally signed by a trusted authority to ensure that the certificate has not been tampered with and to attest or certify that the public key associated with the certificate is authentic.

At 704 the client validates the certificate sent by the server, and extracts the public key of the server.

At 706, the client generates a pre-master secret using the random numbers generated by the client and the server.

At 708, the client encrypts the pre-master secret using the public key of the server, and sends the encrypted pre-master secret to the server.

At 806, the server decrypts the encrypted pre-master secret using a private key of the server.

At 710 the client computes encryption and MAC keys from a combination of the pre-master secret, the client generated random number, and the server generated random number.

At 808 the server computes the encryption and MAC keys from the combination of the pre-master secret, the client generated random number, and the server generated random number.

At this stage, the client and server may each have a key to perform symmetric key encryption.

At 712, the client generates a MAC of handshake messages sent to and received from the server, encrypts the MAC using the symmetric key generated by the client, and sends the encrypted MAC to the server.

At 810, the server generates a MAC of handshake messages sent to and received from the client, encrypts the MAC using the symmetric key generated by the server, and sends the encrypted MAC to the client.

At 714, the client decrypts the server-generated MAC and compares the client generated MAC with the server generated MAC.

At 716, if the client generated MAC and the server generated MAC are equivalent, the server may be authorized to access at least a portion of the physical device (i.e., Org binding is successful). Where the device includes protected memory, the client may unlock one or more logical block address (LBA) ranges in accordance with a policy at 718, in response to request from the server. If the client generated MAC and the server generated MAC are not equivalent, Org-Binding fails and the client maintains an un-bound state at 720.

Figure 9:
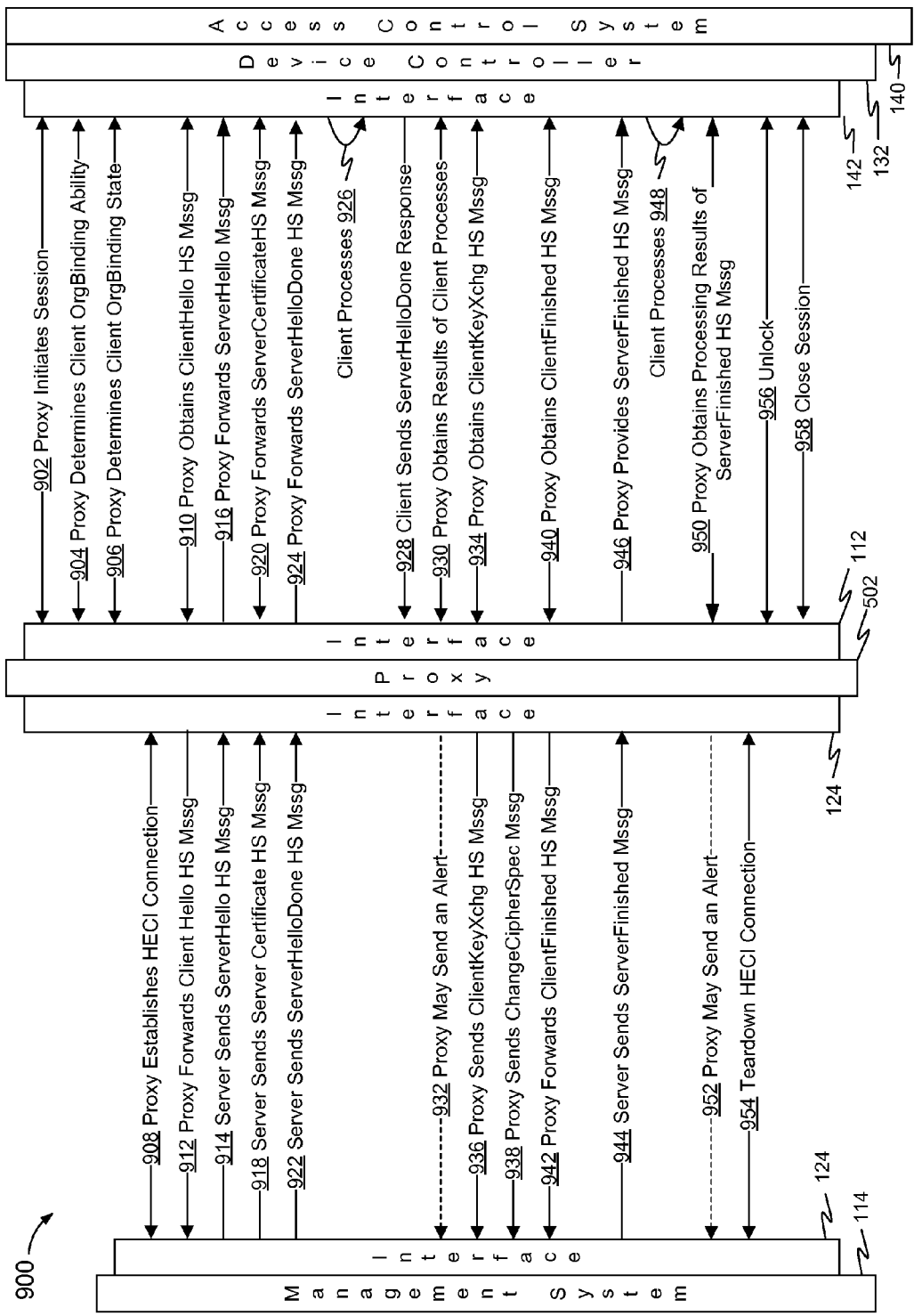
FIG. 9 is flowchart of a method of performing a proxy-based binding procedure between a device and a computer system.

FIG. 9 is flowchart of a method 900 of performing a proxy-based binding procedure between a device and a computer system.

For illustrative purposes, method 900 is described with respect to, and is superimposed over a block diagram of portions of computer system 102 and device 104. Method 900 is not, however, limited to the examples of computer system 102 and device 104.

At 902, proxy interface 502 initiates communications with device 104. Device 104 may prompt proxy interface 502 to provide user authentication credentials, such as a username and password. A communication session may be established upon user authentication At 904, proxy interface 502 determines whether device 104 is enabled for OrgBinding. If device 104 is not configured for OrgBinding, proxy interface 502 may close, such as at 960 below.

At 906, proxy interface 502 determines an OrgBinding state of device 104.

Binding states may include one or more of un-provisioned, provisioned-locked, and provisioned-unlocked. Un-provisioned indicates that device 104 has not been provisioned with a certificate, certificate chain, or a hash thereof. Provisioned-locked indicates that device 104 has been provisioned with a certificate, certificate chain, or a hash thereof, but has not yet authenticated computer system 102. Provisioned-unlocked indicates that device 104 has been provisioned with a certificate, certificate chain, or a hash thereof, and has authenticated computer system 104 during a current power cycle.

When the OrgBinding state is provisioned-unlocked, proxy interface 502 may close, such as at 958 below.

At 908, proxy interface 502 establishes a connection or communication session with management system 114 through management interface 124.

Starting at 910, proxy interface 502 forwards handshake message between management system 114 and device 104.

Device 104 may include a record header and a handshake header with handshake messages. Management system 114 and device 104 may each maintain a digest of all received handshake messages to be used as described below. Accordingly, proxy interface 502 may be configured to forward the handshake messages between device 104 and management system 114 without modification to preserve integrity of the processes.

At 910, proxy interface 502 obtains a ClientHello handshake message from device 104.

At 912, proxy interface 502 sends the ClientHello handshake message to management system 114 through management interface 124. After transmitting the ClientHello message to management system 114, proxy interface 502 may wait for management system 114 to send a ServerHello handshake message. Management system 144 may extract information from the payload for subsequent processing, such as described below with respect to 918.

At 914, management system 114 sends the ServerHello handshake message to proxy interface 502 in response to the Client Hello handshake message.

At 916, proxy interface 502 forwards the ServerHello handshake message to device 104. Device 104 may extract information from the payload for subsequent processing described below with respect to 926 below.

At 918, management system 114 sends ServerCertificate handshake message, including a server certificate chain, to proxy interface 502.

At 920, proxy interface 502 forwards the ServerCertificate handshake message to device 104.

At 922, management system 114 sends a ServerHelloDone handshake message to proxy interface 502 to indicate the end of the ServerHello and associated messages.

At 924, proxy interface 502 forwards the ServerHelloDone handshake message to device 104.

At 926, device 104 processes data handshake messages received from management system 114. The processing may include sanity checks and other processing, such as certificate validation. Example certificate validation procedures are disclosed further below.

At 928, device 104 sends a ServerHelloDoneResponse to indicate that processing at 926 is complete.

At 930, proxy interface 502 obtains results the processing at 926.

At 932, if the processing at 926 did not complete successfully, proxy interface 502 may send an alert to management system 114 at 932. Proxy interface 502 may also terminate the session with management system 114, such as described below with respect to 954, and may terminate the session with device 104, such as described below with respect to 958.

At 934, device 104 sends a client ClientKeyXchg handshake message.

At 936, proxy interface 502 forwards the ClientKeyXchg handshake message to management system 114 using message data provided by device 104.

At 938, proxy interface 502 sends a ChangeCipherSpec message to management system 114 to indicate that subsequent messages to and from device 104 are to be encrypted using the negotiated algorithm.

At 940, proxy interface 502 requests a finished handshake message from device 104. In response, device 104 encrypts and HMACs handshake message data using the negotiated cipher suite to include in a ClientFinished handshake message. The ClientFinished handshake message may include a digest of handshake messages sent and received by device 104.

At 942, proxy interface 502 forwards the ClientFinished handshake message to management system 114.

At 944, management system 114 sends a ServerFinished message, including an encrypted, HMACed data payload that includes a digest of handshake messages sent and received by management system 114.

At 946, proxy interface 502 forwards the ServerFinished message to device 104.

At 948, device 104 compares the digest of handshake messages received from management system 114 with the digest generated by device 104, described at 940 above. If the digests are equivalent, device 104 may conclude that certificate chain provided at 918 is valid, and correspondingly, that management system 114 is valid. In this situation, OrgBinding is successful. Otherwise, device 102 may conclude that management system 114 is not valid, and OrgBinding is not successful.

At 950, proxy interface 502 receives results of the processing at 948.

At 952, proxy interface 502 may send an alert to management system 114 if device 104 did not authenticate management system 114 at 948.

At this point, the handshake protocol is complete, whether management system 114 is authenticated at 948, or is not authenticated at 948.

At 954, upon completion of the handshake protocol, either due to success or failure, proxy interface 502 disconnects from management interface 124.

At 956, proxy interface 502 sends a request to device 104 to unlock protected portion 130 of device 104 if OrgBinding was successful. Where protected portion 130 includes memory, the request may include one or more ranges of the memory to unlock.

At 958, the session between proxy interface 502 and device 104 is closed.

Subsequent to closure of the session, protected portion 130 of device 104 may be accessed from an operating environment of processor 106 if the handshake protocol completed successfully and protected portion 130 has been unlocked.

Additional provisioning features are now disclosed.

Device 104 may be provisioned by a host initiated session started in an authorized authority context. Provisioning may include providing device 104 with one or more platform certificates, certificate chains, or hashes thereof, and enabling OrgBinding.

Provisioning may occur before, during, or subsequent to configuring of user definable features, such as access control, locking ranges, and user passwords. Device 104 may be configured so that a locking range, once activated, does not revert.

Provisioning may be performed during a session initiated by an administrator authority and/or a manager authority.

An administrator authority may be defined in accordance with a Trusted Computing Group (TCG) Storage Architecture Core Specification.

A manager authority may be used where separate authorities are responsible for configuring user definable features and for provisioning OrgBinding features. Such a differentiation permits an organization to manage security aspects of device 104 in-house, and to permit delegation of less secure manageability aspects to a third party and/or to an internal authority that has lower security credentials.

A Manager authority may be a special user having a higher privilege level than a user authority, but lower than an administrator authority.

Additional certificate chain and hashing features are now disclosed.

During provisioning, provisioning software may compute one or more hashes, which may be in accordance with a SHA-256 standard, of one or more certificate chains that are to be valid for device 104. The hash values may be provisioned to device 104 prior to enablement of OrgBinding in device 104.

OrgBinding may be implemented to support multiple classes of certificates or certificate hashes, which may be associated with, for example, one or more of a hierarchy, departments, divisions, and/or functions, of an organization.

Figure 10:
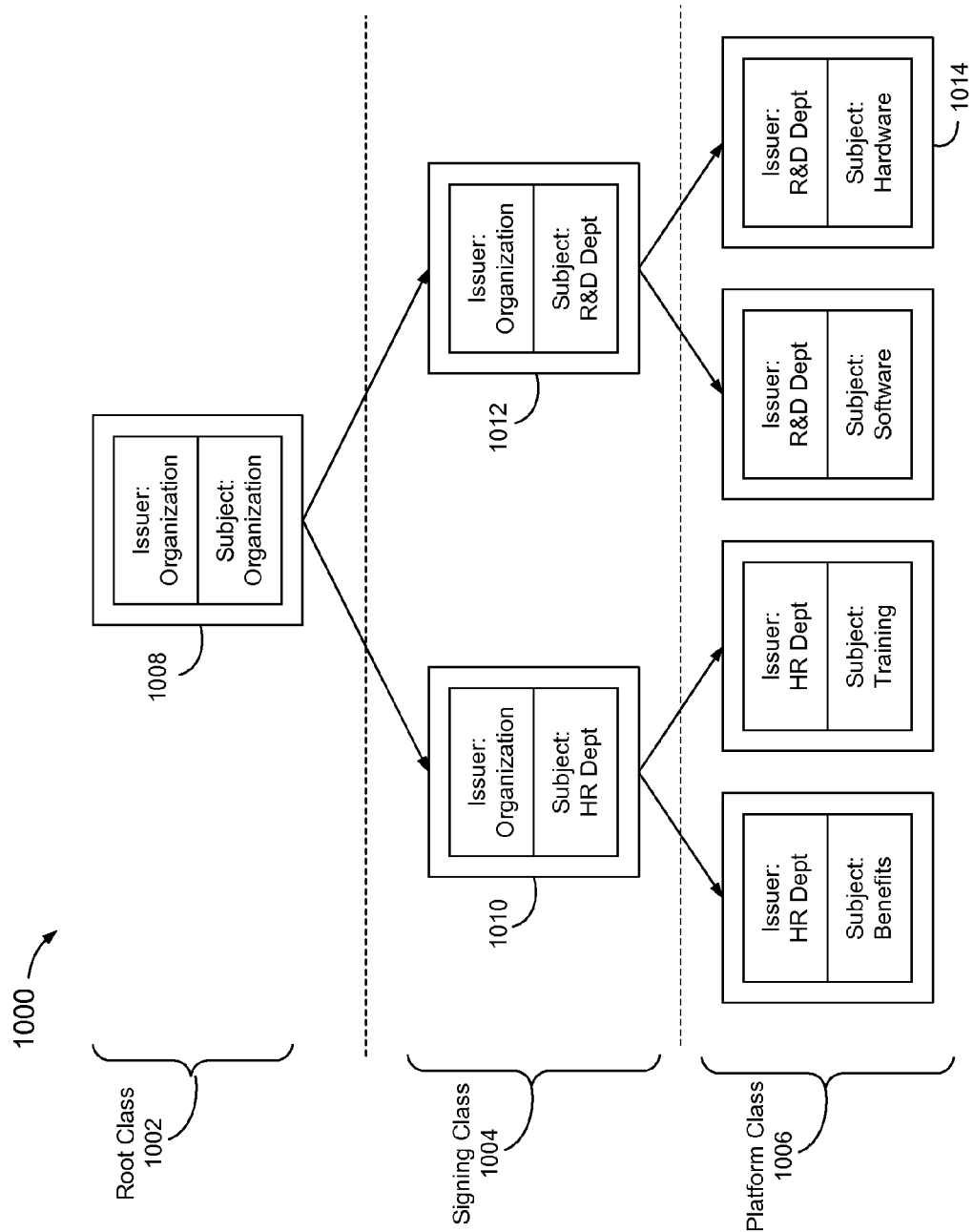
FIG. 10 is a graphic depiction of example certificate classes and certificate chains.

FIG. 10 is a graphic depiction of three certificate classes associated with an example organization, including a root certificate class 1002, a signing certificate class 1004, and a platform certificate class 1006.

Regarding root certificate class 1002, device 104 may be provisioned with hashes of one or more root certificates, and management system 104 may be configured to provide one root certificate to device 104 during an authentication procedure.

Regarding signing certificate class 1004, device 104 may be provisioned with hashes of one or more signing certificates, and management system 104 may be configured to provide a hash of the certificate chain up to and including the certificate authority used to sign the platform, or root class certificate.

Regarding platform certificate class 1006, device 104 may be provisioned with hashes of one or more platform certificates, and management system 114 may be configured to provide a hash of the entire certificate chain up to and including the platform, or root class certificate.

If device 104 is allowed to be used by any platform associated with the organization, a hash of a certificate authority chain of root class 1008, (Subject: Organization), may be provisioned to device 104.

If device 104 is allowed to be used only by platforms associated with a human resources (HR) department of the organization, a hash of a certificate authority 1010 (Subject: Organization+Subject: HR Dept), may be provisioned to device 104.

If device 104 is allowed to be used only by platforms associated with a research and development (R&D) department of the organization, a hash of certificate authority chain 1008 and 1012 (Subject: Organization+Subject: R&D Dept), may be provisioned to device 104.

If device 104 is allowed to be used only by any platform of the HR department and the R&D department, a hash of certificate authority chains 1008 and 1010, and of 1008 and 1010 may be provided to device 104.

If device 104 is only allowed to be used by platforms associated with a (non-certificate authority) hardware group within the R&D department of the organization, a hash of certificate authority chain 1008, 1010, and 1014 (Subject: Organization+Subject: R&D Dept+Subject: Hardware), may be provisioned to device 104.

Additional certificate validation features are now disclosed.

Certificate validation may vary depending which certificate class device 104 is bound to. Validation may include hash checking and/or digital signature checking. The level of validation may depend on whether authentication has been previously performed for the first time since device 104 was provisioned, for a first time with respect to a particular computer system, and/or for a first time during a current power cycle.

Example operation of device 104 is now described with respect to a first user authentication following initial provisioning and configuring of device 104.

Where device 104 is bound using root class certificates, device 104 may validate an entire certificate chain starting with the root certificate and finishing with an end entity certificate, such as disclosed below.

Device 104 may compute a hash of the root certificate and compare the hash against a list of root class certificates to which device 104 is bound, or for which device 104 has been provisioned. If no match is found, computer system 104 is invalid and access to protected portion 130 is precluded.

If the computed hash matches one of the root class certificates to which device 104 is bound, device 104 checks a digital signature of each certificate in the chain. If there is a signature discrepancy at any point during the validation, computer system 102 is considered invalid and access to protected portion 130 is precluded. Otherwise, device 104 computes a hash of the entire certificate chain and saves the resultant hash, pending server authentication, in persistent storage.

Thereafter, device 104 continues with the authentication protocol to confirm the identity of the server. If the server and certificate chain are valid, device 104 may save the certificate chain hash in persistent storage to optimize subsequent authentication/OrgBinding processing.

Where device 104 is bound using signing class certificates, device 104 may validate the certificate chain as disclosed below.

Device 104 may compute a hash of the certificate chain starting with the root certificate and finishing with the end entity certificate of the chain. Device 104 may then compare the computed hash against the list of signing class certificates to which device 104 is bound. If no match is found, computer system 102 is invalid and host access to protected portion 130 is precluded.

If the computed hash matches a signing class certificate to which device 104 is bound, device 104 continues validation of the chain by checking the digital signature of the end entity certificate signed by an associated certificate authority. If the computed signature does not match the signature contained within the certificate being checked, computer system 102 is considered invalid and access to protected portion 130 is precluded. Otherwise, device 104 computes a hash of the entire certificate chain saves the resultant hash in persistent storage pending server authentication.

Device 104 continues with the authentication protocol to confirm the identity of the server. If the server and certificate chain are valid, device 104 may save the certificate chain hash in persistent storage to optimize subsequent authentication/OrgBinding processing.

Where device 104 is bound using a platform class certificate, device 104 may validate the certificate chain as disclosed below.

Device 104 may compute a hash of the entire certificate chain starting with the root certificate and finishing with the end entity certificate in the chain.

Device 104 may then compare the computed hash against a list of platform class certificates to which device 104 is bound. If no match is found, computer system 102 is invalid and access to protected portion 130 is permitted.

Device 104 continues with the authentication protocol to confirm the identity of the server. If the server and certificate chain are valid, device 104 may omit saving of the certificate chain hash in persistent storage as it may currently be saved in a server certificate store table.

Example validation operation of device 104 is now described with respect to non-first time authentication following a successful non-first time user authentication, subsequent to provisioning and configuring of device 104.

Authentication in such a situation may be substantially similar or identical for different certificate classes.

Device 104 may use a certificate chain contained in the server certificate table to computes a hash of an entire certificate chain received from computer system 102.

Device 104 may compare the computed hash against the hash value previously computed and stored during a first time user authentication, such as described above.

If the two hashes match, then the certificate chain is assumed to be valid, pending server authentication. Device 104 may proceed to server authentication without further certificate validation, such as digital signature checking.

If device 104 has been moved to a different platform between power cycles, the certificate chain hashes may not match, and device 104 may resort to authentication procedures described above.

Device 104 may be configured to determine whether a certificate has been revoked since provisioning.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A system, comprising:
a processor to initiate an authentication handshake protocol between a device and a trusted controller system, to relay communications between the device and the trusted controller system during the authentication handshake protocol, and to access a protected portion of the device subsequent to completion of the authentication handshake protocol; and
the trusted controller system to perform a server side portion of the authentication handshake protocol outside of an environment of the processor to permit the device to authenticate the trusted controller system,
the device, wherein the device includes:
an access control system having a default state configured to preclude access to the protected portion of the device; and
a device controller to compute and authenticate a hash value of a certificate chain received from the trusted controller system, to verify integrity of messages exchanged with the trusted controller system, and to control the access control system to permit the processor to access the protected portion of the device subsequent to the authentication and the verification, and
wherein the processor is configured to, prior to initiating the authentication handshake:
determine whether a binding state of the device is unprovisioned such that the device has not been provisioned with a certificate, certificate chain, or hash thereof;
determine whether the binding state of the device is provisioned-locked such that the device has been provisioned with a certificate, certificate chain, or hash thereof; and
determine whether the binding state of the device is provisioned-unlocked such that the device has been provisioned with a certificate, certificate chain, or a hash thereof, and has authenticated the trusted controller system.

2. The system of claim 1, wherein the trusted controller system includes a management system to perform management functions with respect to the processor outside of an environment of the processor, and wherein the processor is further configured to:
initiate communications with the device through a device interface; and
initiate a communication session with the management system and relay the handshake messages to and from the management system through a management system interface during the authentication handshake protocol.

3. The system of claim 1, wherein the trusted controller system and the device are configured to implement one or more of a secure sockets layer (SSL) handshake protocol and a transport layer security (TLS) handshake protocol.

4. The system of claim 1, wherein the certificate chain includes a plurality of hierarchically related certificates.

5. The system of claim 1, wherein the protected portion of the device includes computer memory, and wherein the device interface includes one or more of a serial ATA connector and a universal serial bus connector.

6. The system of claim 1, wherein the device controller is configured to preclude access to the protected portion of the device when the authentication handshake protocol is not completed within a pre-determined period of time.

7. Multiple non-transitory computer readable mediums, comprising:
a first non-transitory computer readable medium encoded with a first computer program, including instructions to cause a processor to,
initiate an authentication handshake protocol between a device and a trusted controller system and relay communications between the device and the trusted controller system during the authentication handshake protocol, and
access a protected portion of the device subsequent to completion of the authentication handshake protocol;
a second non-transitory computer readable medium encoded with a second computer program, including instructions to cause the trusted controller system to perform server side functions of the authentication handshake protocol outside of an environment of the processor to permit the device to authenticate the trusted controller system; and
a third non-transitory computer readable medium encoded with a third computer program, including instructions to cause a controller associated with the device to compute and authenticate a hash value of a certificate chain received from the trusted controller system, verify integrity of messages exchanged with the trusted controller system, and control the access control system to permit the processor to access the protected portion of the device subsequent to the authentication and the verification,
wherein the first computer program further includes instructions to cause the processor to, prior to initiating the authentication handshake:
determine whether a binding state of the device is unprovisioned such that the device has not been provisioned with a certificate, certificate chain, or hash thereof;
determine whether the binding state of the device is provisioned-locked such that the device has been provisioned with a certificate, certificate chain, or hash thereof; and
determine whether the binding state of the device is provisioned-unlocked such that the device has been provisioned with a certificate, certificate chain, or a hash thereof, and has authenticated the trusted controller system.

8. The computer readable mediums of claim 7, wherein the trusted controller system includes a management system to perform management functions with respect to the processor outside of an environment of the processor, and wherein the instructions of the first computer program further include instructions to cause the processor to:
initiate communications with the device through a device interface; and
initiate a communication session with the management system and to relay the handshake messages to and from the management system through a management system interface during the authentication handshake protocol.

9. The computer readable medium of claim 7, wherein the instructions of the second computer program and the instructions of the third computer program each further include instructions to implement one or more of a secure sockets layer (SSL) handshake protocol and a transport layer security (TLS) handshake protocol.

10. The computer readable medium of claim 7, wherein the certificate chain includes a plurality of hierarchically related certificates.

11. The computer readable medium of claim 7, wherein instructions of the third computer program further include instructions to cause the device controller to preclude access to the protected portion of the device when the authentication handshake protocol is not completed within a pre-determined period of time.

12. A method, comprising:
   hosting a proxy interface environment within an environment of a processor, including initiating an authentication handshake protocol between a device and a trusted controller system and relaying communications between the physical device and the trusted controller system during the authentication handshake protocol;
   performing server side functions of the authentication handshake protocol within the trusted controller system outside of the environment of the processor to permit the device to authenticate the trusted controller system;
   accessing a protected portion of the device from within an operating environment of the processor subsequent to completion of the authentication handshake protocol; and
   computing and authenticating a hash value of a certificate chain received from the trusted controller system, verifying integrity of messages exchanged with the trusted controller system, and determining to permit the processor to access the protected portion of the device subsequent to the authentication and the verification, wherein the computing, the authenticating, the verifying, and the determining are performed within a suitably programmed controller associated with the device,
   wherein the hosting a proxy interface environment within an environment of a processor further includes, prior to initiating the authentication handshake:
      determining whether a binding state of the device is un-provisioned such that the device has not been provisioned with a certificate, certificate chain, or hash thereof;
      determining whether the binding state of the device is provisioned-locked such that the device has been provisioned with a certificate, certificate chain, or hash thereof; and
      determining whether the binding state of the device is provisioned-unlocked such that the device has been provisioned with a certificate, certificate chain, or a hash thereof, and has authenticated the trusted controller system.

13. The method of claim 12, wherein the trusted controller system includes a management system to perform management functions with respect to the processor, and wherein the hosting of the proxy environment includes:
   initiating communications with the physical device through a device interface; and
   initiating a communication session with the management system and relaying the handshake messages to and from the management system through a management system interface.

14. The method of claim 12, wherein the authentication handshake protocol includes one or more of a secure sockets layer (SSL) handshake protocol and a transport layer security (TLS) handshake protocol.

15. The method of claim 12,
   wherein the certificate chain includes a plurality of hierarchically related certificates.

16. The method of claim 12, further including:
   precluding access to the protected portion of the device when the authentication handshake protocol is not completed within a pre-determined period of time.

17. The method of claim 12, further including:
   hosting the proxy interface environment within one or more of a pre-boot authentication environment and the operating environment of the processor.

* * * * *